US008413996B2

(12) United States Patent
Hu

(10) Patent No.: US 8,413,996 B2
(45) Date of Patent: Apr. 9, 2013

(54) CHUCK FOR BIT

(76) Inventor: Bobby Hu, Taichung (TW)

( * ) Notice: Subject to any disclaimer, the term of this patent is extended or adjusted under 35 U.S.C. 154(b) by 1148 days.

(21) Appl. No.: 12/335,596

(22) Filed: Dec. 16, 2008

(65) Prior Publication Data

US 2009/0311062 A1 Dec. 17, 2009

(30) Foreign Application Priority Data

Jun. 11, 2008 (TW) ............................... 97121823 A

(51) Int. Cl.
*B32B 31/107* (2006.01)

(52) U.S. Cl. ............................. 279/82; 279/66; 279/904

(58) Field of Classification Search .................... 279/76, 279/66, 74, 82, 904, 71, 81; *B23B 31/107*
See application file for complete search history.

(56) References Cited

U.S. PATENT DOCUMENTS 4,629,375 A 12/1986 Lieser ........................... 408/239
4,824,280 A * 4/1989 Alter .......................... 403/322.2
5,090,275 A * 2/1992 McCann .................... 81/177.85
5,417,527 A * 5/1995 Wienhold ................. 408/239 R
5,740,704 A * 4/1998 Payne ............................... 81/60
6,000,300 A * 12/1999 Plamondon .................... 81/90.2
6,270,085 B1 * 8/2001 Chen et al. ....................... 279/22
6,325,393 B1 * 12/2001 Chen et al. ....................... 279/22
6,637,755 B2 * 10/2003 Chen et al. ....................... 279/22
6,666,114 B1 * 12/2003 Lin ................................. 81/438
6,695,321 B2 * 2/2004 Bedi et al. ........................ 279/22
6,808,182 B2 * 10/2004 Lin ................................. 279/74
6,840,143 B1 * 1/2005 Lin ................................. 81/438
6,929,266 B2 * 8/2005 Peters et al. ..................... 279/82
7,424,841 B2 * 9/2008 Liu ................................. 81/438
7,469,909 B2 * 12/2008 Strauch et al. .................. 279/75
7,481,136 B2 * 1/2009 Chiang ...................... 81/177.75
7,726,664 B2 * 6/2010 Peters ........................... 279/143
7,823,890 B2 * 11/2010 Chen ............................. 279/143
7,891,275 B2 * 2/2011 Huang ............................ 81/438
7,913,592 B2 * 3/2011 Hu .................................. 81/438
7,922,180 B2 * 4/2011 Meng ............................ 279/143
7,954,824 B2 * 6/2011 Hu .................................. 279/22
8,262,097 B2 * 9/2012 Lai .................................. 279/74
2003/0140744 A1 * 7/2003 Chen ............................... 81/438
2003/0178794 A1 * 9/2003 Chen et al. ....................... 279/22
2007/0044596 A1 * 3/2007 Chen ............................... 81/125
2008/0190251 A1 * 8/2008 Huang ............................ 81/438
2009/0309316 A1 * 12/2009 Hu .................................. 279/75
2009/0309317 A1 * 12/2009 Hu .................................. 279/82
2009/0311062 A1 * 12/2009 Hu ............................ 408/239 R

* cited by examiner

*Primary Examiner* — Eric A Gates
*Assistant Examiner* — Bayan Salone
(74) *Attorney, Agent, or Firm* — Alan Kamrath; Kamrath IP Lawfirm, P.A.

(57) ABSTRACT

A chuck includes a body having an engaging groove for releasably receiving a bit. A sleeve is slideably mounted around the body. The body further includes an annular groove in an outer periphery thereof. The annular groove includes a positioning portion having an opening extending into the engaging groove. A retainer ring is mounted in the annular groove and includes a section extending into the engaging groove via the opening to engage with and retain the bit in the engaging groove.

14 Claims, 14 Drawing Sheets

CHUCK FOR BIT

BACKGROUND OF THE INVENTION

The present invention relates to a chuck for a bit and, more particularly, to a chuck for releasably receiving a bit such as a screwdriver bit.

Various chucks have been developed to allow quick change of a bit such as a screwdriver bit. A typical quick-change chuck includes a body having a first end coupled to a wrench or a screwdriver handle and a second end with a groove into which a shank of a bit is removably mounted. A sleeve is mounted around the body and movable along a longitudinal axis of the body between a coupling position in which a ball is engaged with the shank of the bit and, thus, retains the shank in place and a releasing position in which the ball is disengaged from the shank to allow removal or mounting of the bit. A spring is provided to bias the sleeve to the coupling position. An example of such a chuck is disclosed in U.S. Pat. No. 4,629,375. However, the chuck disclosed in U.S. Pat. No. 4,629,375 requires an end ring to prevent the sleeve from disengaging from the shank, leading to an increase in the total weight of the chuck as well as the costs. Furthermore, the bit is not engaged with any member and may fall freely when the sleeve is in the releasing position, leading to problems during replacement of the bit. In an approach to avoid falling of the bit, a magnet is mounted inside the body for attracting the bit. However, such a device can not be utilized in places having electronic equipment, for the magnet will interfere in operation of the electronic equipment. Further, the chucks are usually utilized in an environment with oil such that the fingers of a user often slip and, thus, can not effectively move the sleeve to the releasing position, leading to problems during mounting or replacement of bits. Furthermore, it is well known that when using a tool to tighten or loosen a fastener such as a screw, rotating the screw in a loose state through operation of the tool is troublesome and inefficient.

Thus, a need exists for a chuck that allows easy removal of the bit and that allows rapid rotating of the chuck to rapidly rotate the fastener in a loose state.

BRIEF SUMMARY OF THE INVENTION

The present invention solves this need and other problems in the field of chucks for bits by providing, in a preferred form, a chuck including a body having a first end and a second end spaced from the first end along a longitudinal axis of the body. The second end of the body includes an engaging groove adapted for releasably receiving the bit. The second end of the body further includes an annular groove in an outer periphery thereof. The annular groove includes a positioning portion having an opening extending into the engaging groove. The first end of the body is adapted for releasably coupling with a tool such that rotational movement of the tool causes rotational movement of the bit. A sleeve is mounted around the body and movable relative to the body along the longitudinal axis between a coupling position and a releasing position. The sleeve includes a first compartment slideably receiving the second end of the body and a second compartment spaced from the first compartment along the longitudinal axis and slideably receiving the first end of the body. A retainer ring is mounted in the annular groove. The retainer ring includes a section extending into the engaging groove of the body via the opening to engage with and retain the bit in the engaging groove. A spring is mounted between the body and the sleeve and biases the sleeve to the coupling position.

The retainer ring is sandwiched and retained between an inner periphery of the first compartment and the bottom wall of the annular groove when the sleeve is in the coupling position, preventing movement of the section of the retainer ring out of the engaging groove. The retainer ring imparts a clamping force to retain the bit in the engaging groove.

The bit is removable from the engaging groove of the body when the sleeve is in the releasing position. The section of the retainer ring is movable away from the engaging groove when applying a removing force to remove the bit from the engaging groove.

In a most preferred form, the bit is retained in the engaging groove by the clamping force of the retainer ring when the sleeve is in the releasing position and when no force is applied to the bit. The retainer ring has resilience capable of returning the section of the retainer ring to engage with the bit during application of the removing force when the sleeve is in the releasing position, so that the bit is retained in place by the section of the retainer ring when the removing force is released before the bit is removed out of the engaging groove.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
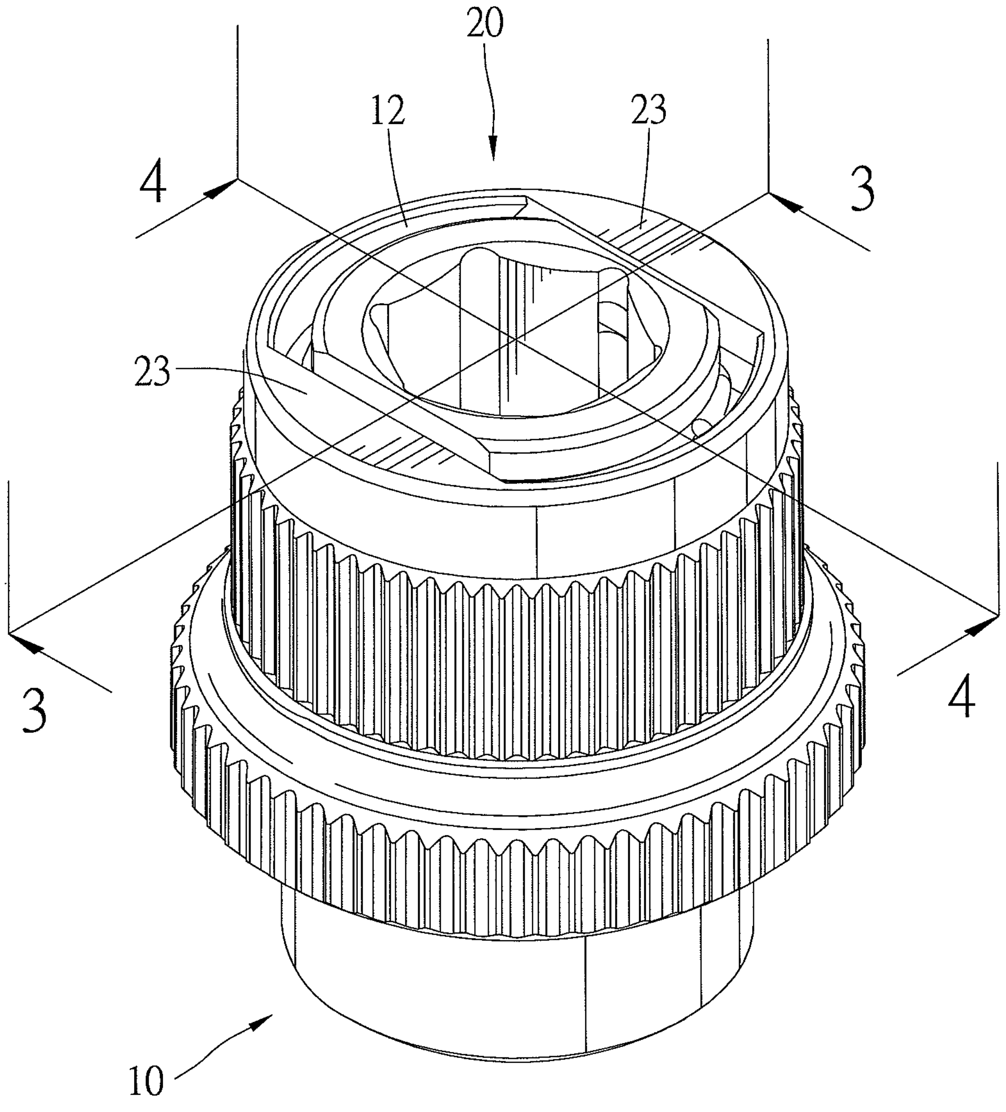
FIG. 1 shows a diagrammatic perspective view of a chuck for a bit of a first embodiment according to the preferred teachings of the present invention.
Figure 2:
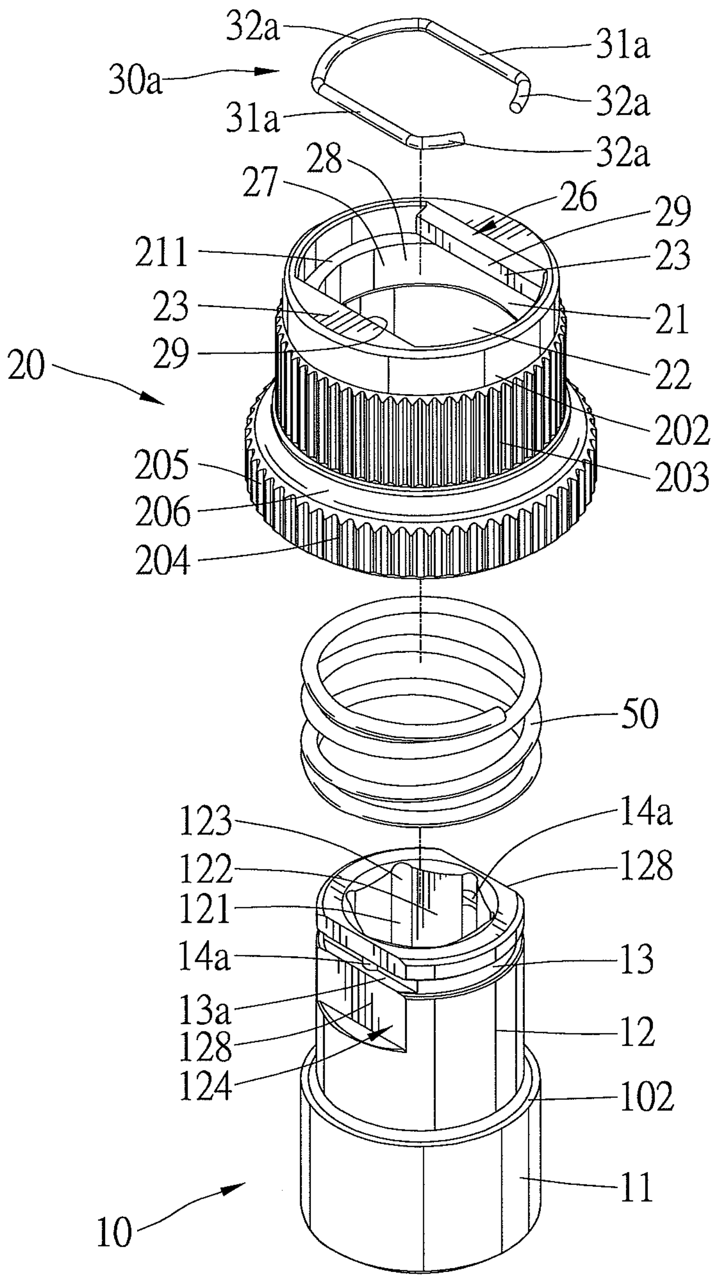
FIG. 2 shows an exploded, perspective view of the chuck of FIG. 1.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms “first”, “second”, “inner”, “outer”, “end”, “portion”, “section”, “longitudinal”, “radial”, “circumferential”, “annular”, “outward”, “inward”, “length”, and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

A chuck for a bit of a first embodiment according to the preferred teachings of the present invention is shown in FIGS. 1-7 of the drawings. According to the preferred form shown, the chuck includes a body 10 having first and second ends 11 and 12 spaced along a longitudinal axis of body 10. Body 10 includes a longitudinal through-hole extending along the longitudinal axis and in the preferred form shown as having a coupling groove 111 and an engaging groove 121 respectively in first and second ends 11 and 12 of body 10 and an intermediate section 101 between coupling groove 111 and engaging groove 121. Coupling groove 111 releasably couples with a tool 90 in the preferred form shown as a socket wrench including a drive column 91 having a ball 92. According to the most preferred form shown, coupling groove 111 is square in cross section and includes four faces 112 each having a recess 113 for releasably engaging with ball 92 of drive column 91. It can be appreciated that drive column 91 can be of any desired form and size as conventional including but not limited to of a commercially available type and that coupling groove 111 can be modified to correspond to the form and size of drive column 91. As an example, coupling groove 111 can be hexagonal in cross section and has six faces to couple with a drive column having hexagonal cross sections. Engaging groove 121 is polygonal in cross section and, in the most preferred form, is hexagonal and includes six faces 122 at 120 degrees to one another with a corner 123 formed between two of faces 122 adjacent to each other. Engaging groove 121 releasably receives a shank 82 of a bit 80 having six sides and a groove 81 in the preferred form shown as a plurality of groove sections on an outer periphery of shank 82. Rotational movement of tool 90 causes rotational movement of bit 80. According to the preferred form shown, second end 12 of body 10 further includes a coupling section 124 in the most preferred form shown as two diametrically opposed second chamfered faces 128 formed on an outer periphery of second end 12 of body 10 and parallel to and spaced from the longitudinal axis. Second end 12 of body 10 further includes an annular groove 13 in the outer periphery thereof. According to the most preferred form shown, annular groove 13 includes two parallel, spaced diametrically opposed rectilinear positioning portions 13*a* each extending across one of chamfered faces 128. An opening 14*a* is defined in a bottom wall of each positioning portion 13*a* and extends through one of corners 123 of engaging groove 121. Thus, annular groove 13 is in communication with engaging groove 121 via openings 14*a*. Body 10 further includes a shoulder 102 formed on an intermediate portion of the outer periphery thereof and spaced from coupling section 124 along the longitudinal axis.

According to the preferred form shown, the chuck further includes a sleeve 20 mounted around and movable relative to body 10 along the longitudinal axis between a coupling position and a releasing position. Sleeve 20 includes a first compartment 21 slideably receiving second end 12 of body 10 and a second compartment 22 spaced from first compartment 21 along the longitudinal axis and slideably receiving first end 11 of body 10. First compartment 21 further includes an inner flange 27 formed on an inner periphery thereof. Inner flange 27 includes a first end face 211 facing away from second compartment 22, a second end face 201 facing second compartment 22, and an inner periphery 28 extending between first and second end faces 211 and 201. Each of first and second end faces 211 and 201 extends transversely and, in the most preferred form shown, perpendicularly to the longitudinal axis. A spring 50 is mounted around body 10 between shoulder 102 and second end face 201 of inner flange 27. Spring 50 biases sleeve 20 to the coupling position. Sleeve 20 further includes an engaging section 26 coupled with coupling section 124 of the body 10 to allow joint rotation of sleeve 20 and body 10 about the longitudinal axis when sleeve 20 is manually rotated while allowing movement of sleeve 20 relative to body 10 along the longitudinal axis between the coupling position and the releasing position. According to the most preferred form shown, engaging section 26 of sleeve 20 includes two diametrically opposed extensions 23 extending inward from the inner periphery of first compartment 21 of sleeve 20 in a radial direction perpendicular to the longitudinal axis. Each extension 23 includes a flat face 29 having a spacing to the longitudinal axis in the radial direction smaller than inner periphery 28 of inner flange 27. Furthermore, each extension 23 has a spacing to second compartment 22 along the longitudinal axis larger than inner flange 27. Flat faces 29 slideably abut chamfered faces 128 along the longitudinal axis allowing sliding movement of sleeve 20 relative to body 10. However, flat faces 29 are engaged with chamfered faces 128 to allow joint rotation of sleeve 20 and body 10 when sleeve 20 is manually rotated about the longitudinal axis.

According to the preferred form shown, sleeve 20 further includes a flange 204 formed on an end of an outer periphery thereof and around second compartment 22. Flange 204 has an end face 206 that can be gripped by a user for moving sleeve 20 from the coupling position to the releasing position. Flange 204 includes a frictional outer periphery 205 in the most preferred form shown as a plurality of annularly spaced ribs. Frictional outer periphery 205 provides friction when sleeve 20 is manually rotated about the longitudinal axis by manually rotating frictional outer periphery 205. Sleeve 20 further includes an annular protrusion 202 formed on the other end of the outer periphery thereof and around first compartment 21. Annular protrusion 202 includes a frictional outer periphery 203 in the most preferred form shown as a plurality of annularly spaced ribs. Frictional outer periphery 203 provides friction when sleeve 20 is manually rotated about the longitudinal axis by manually rotating frictional outer periphery 203.

According to the preferred form shown, the chuck further includes a retainer ring 30*a* having annularly spaced first, second, and third arcuate sections 32*a*. Retainer ring 30*a* further includes a first rectilinear section 31*a* interconnected between first and second arcuate sections 32*a* and a second rectilinear section 31*a* interconnected between second and third arcuate sections 32*a* and parallel to and spaced from first rectilinear section 31*a*. Second arcuate sections 32*a* are longer than and intermediate first and third arcuate sections 32*a* in a circumferential direction. Distal ends of first and third arcuate sections 32*a* are spaced by a gap. Retainer ring

30*a* is mounted in annular groove 13 of body 10 with first and second rectilinear sections 31*a* respectively received in positioning portions 15*a* of annular groove 13 and with first, second, and third arcuate sections 32*a* partially received in annular groove 13. Specifically, an outer edge of each of first, second, and third arcuate sections 32*a* is outside of annular groove 13 and has a spacing to the outer periphery of sleeve 20 in the radial direction smaller than inner periphery 28 of inner flange 27. Furthermore, a portion of each of first and second rectilinear sections 31*a* extends into engaging groove 121 via one of openings 14*a*.

Figure 3:
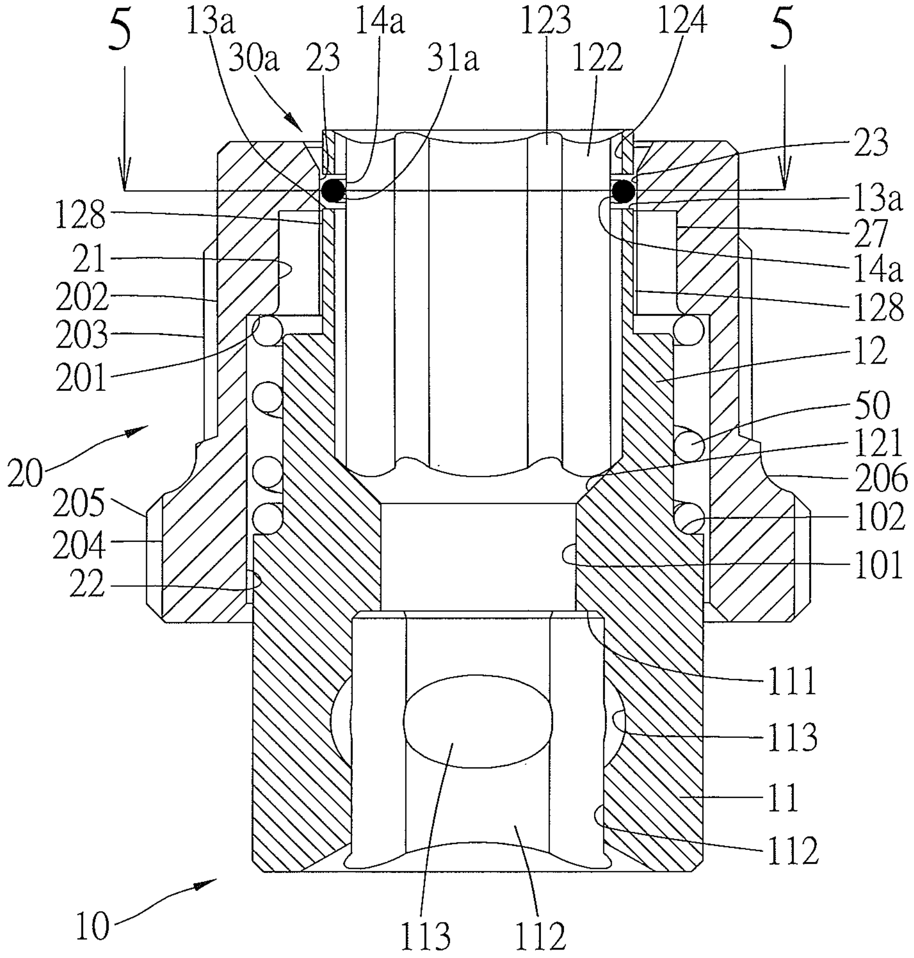
FIG. 3 shows a cross sectional view of the chuck of FIG. 1 according to section line 3-3 of FIG. 1.
Figure 4:
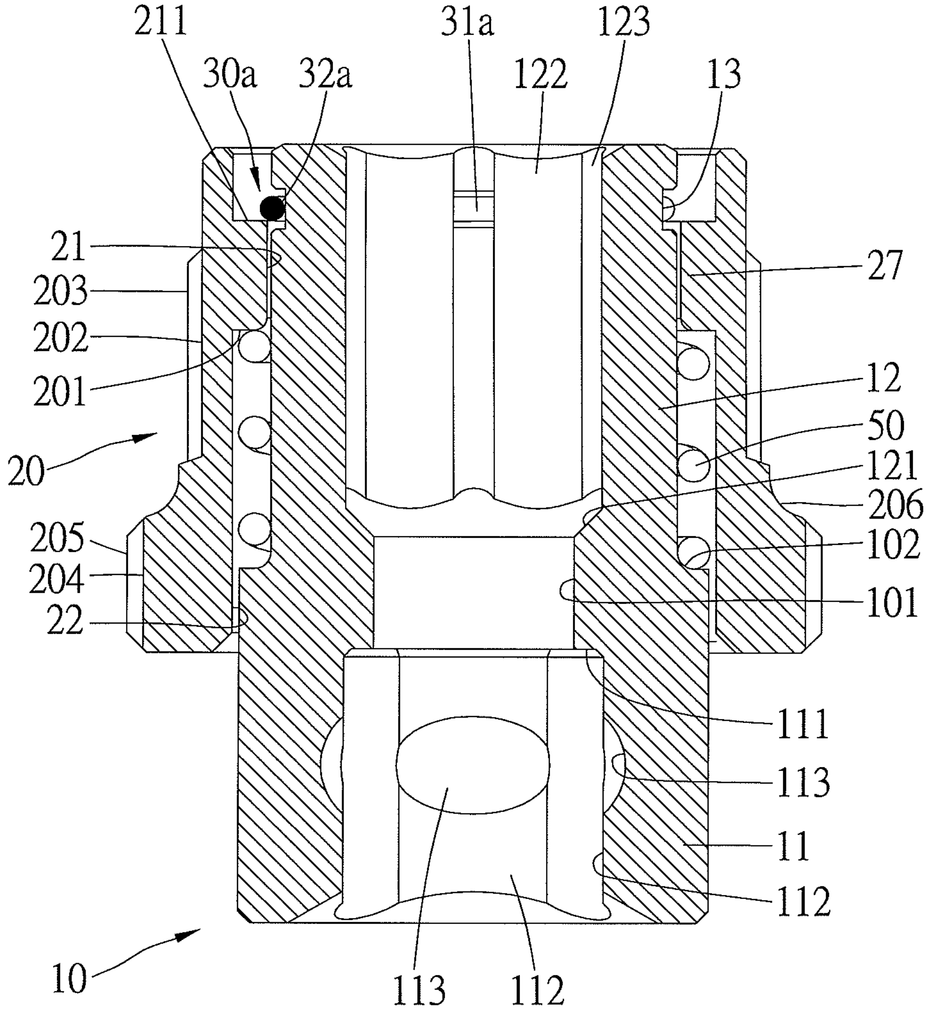
FIG. 4 shows a cross sectional view of the chuck of FIG. 1 according to section line 4-4 of FIG. 1.
Figure 5:
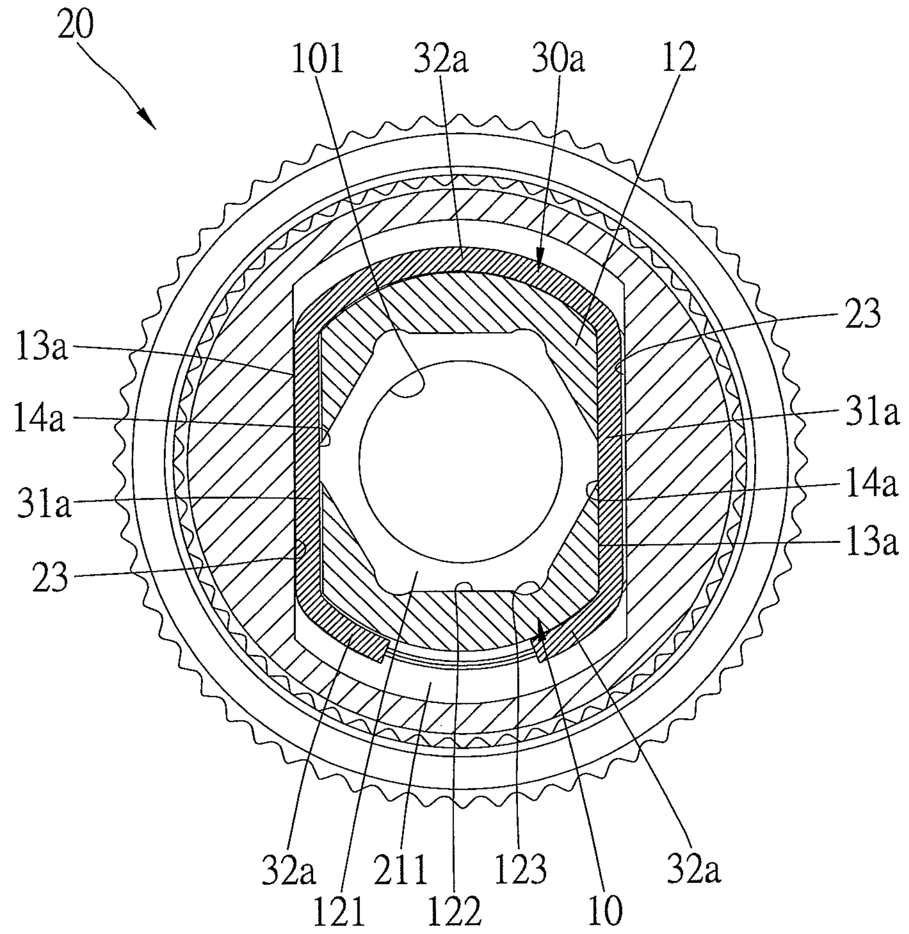
FIG. 5 shows a cross sectional view of the chuck of FIG. 1 according to section line 5-5 of FIG. 3.
Figure 6:
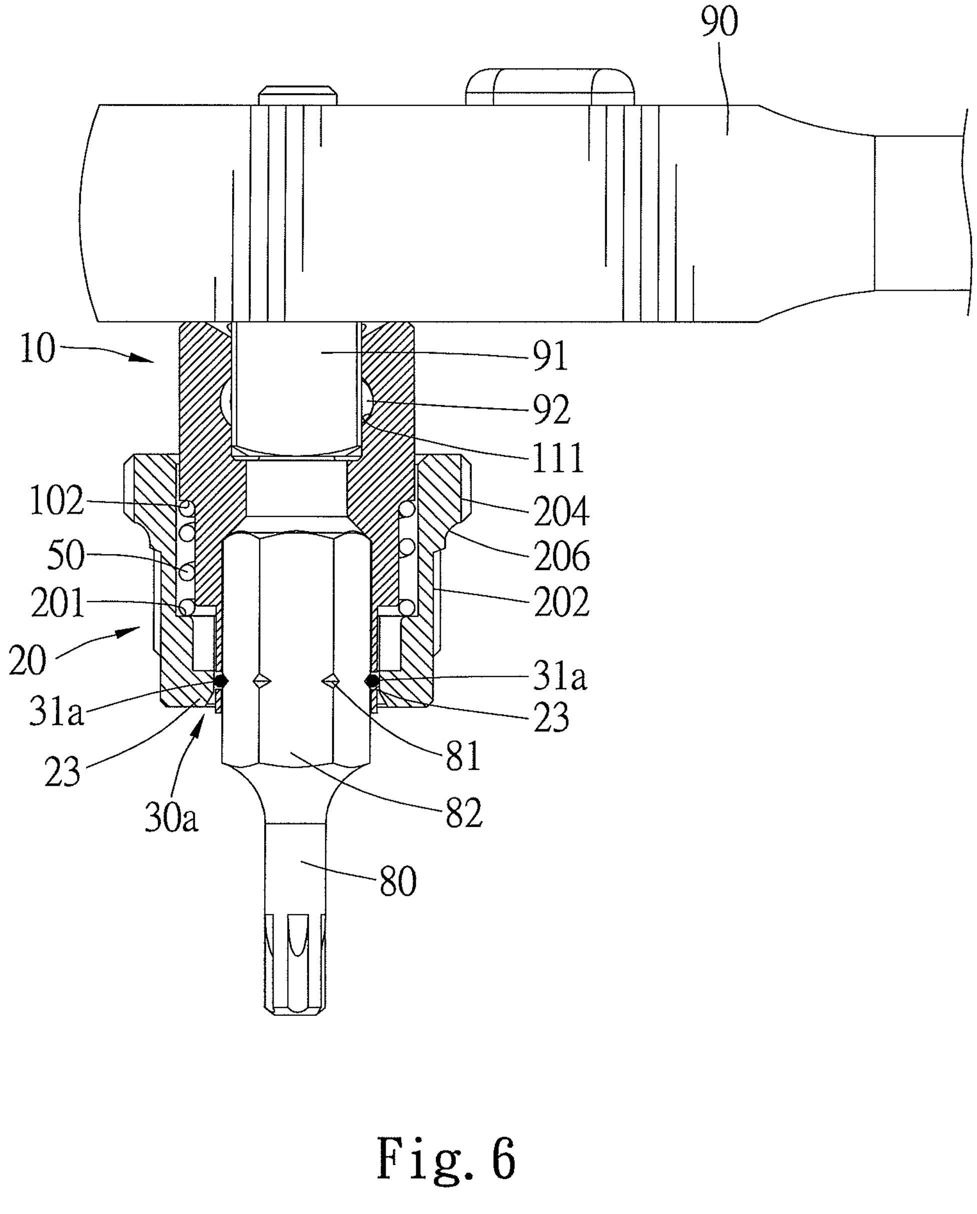
FIG. 6 shows a cross sectional view of the chuck of FIG. 1 with a tool and a bit coupled to the chuck.

Now that the basic construction of the chuck of the preferred teachings of the present invention has been explained, the operation and some of the advantages of the chuck can be set forth and appreciated. In particular, for the sake of explanation, it will be assumed that coupling groove 111 of body 10 is engaged with drive column 91 of tool 90 and that shank 82 of bit 80 is engaged in engaging groove 121 of body 10 with sleeve 20 in the coupling position (FIG. 6). Note that extensions 23 of sleeve 20 is aligned with positioning portions 15*a* of annular groove 13 and cover first and second rectilinear sections 31*a* of retainer ring 30*a* (FIG. 3). Note that each of first and second rectilinear sections 31*a* of retainer ring 30*a* is sandwiched between one of extensions 23 and a bottom wall of annular groove 13. Thus, extensions 23 of sleeve 20 prevent outward movement first and second rectilinear sections 31*a* of retainer ring 30*a* in the radial direction. As a result, a portion of each of first and second rectilinear sections 31*a* is always extended into engaging groove 121 of body 10 via one of openings 14*a* and reliably retained in an engaged position engaged with groove 81 of bit 80 when sleeve 20 is in the coupling position. Accordingly, bit 80 is securely retained in engaging groove 121. Furthermore, since the outer edge of each of first, second, and third arcuate sections 32*a* is outside of annular groove 13 and has a spacing to the outer periphery of sleeve 20 in the radial direction smaller than inner periphery 28 of inner flange 27, disengagement of sleeve 20 from body 10 by moving sleeve 20 away from first end 11 of body 10 is avoided, since first end face 211 of inner flange 27 will be stopped by the outer edges of first, second, and third arcuate sections 32*a* of retainer ring 30*a*. Thus, retainer ring 30*a* reliably retains and clamps bit 80 in place and reliably retains sleeve 20 on body 10.

Bit 80 is rotated when tool 90 is rotated for tightening or loosening a fastener such as a screw or the like. In a case that the fastener to be loosened or tightened is in a loose state, the user can use one of his or her thumbs to turn annular protrusion 202 and/or flange 204 by frictional outer periphery 203 and/or frictional outer periphery 205 to rapidly rotate bit 80 in the loosening or tightening direction. Since flat faces 29 are engaged with chamfered faces 128, sleeve 20 and body 10 rotate jointly when sleeve 20 is manually rotated about the longitudinal axis. Note that the distance between sleeve 20 and tool 90 is small, since the overall length of the chuck is small. Thus, the user can rapidly rotate sleeve 20 and body 10 to rapidly rotate the fastener. Accordingly, troublesome, inefficient operation of tool 90 for rotating the loose fastener is not required.

Figure 7:
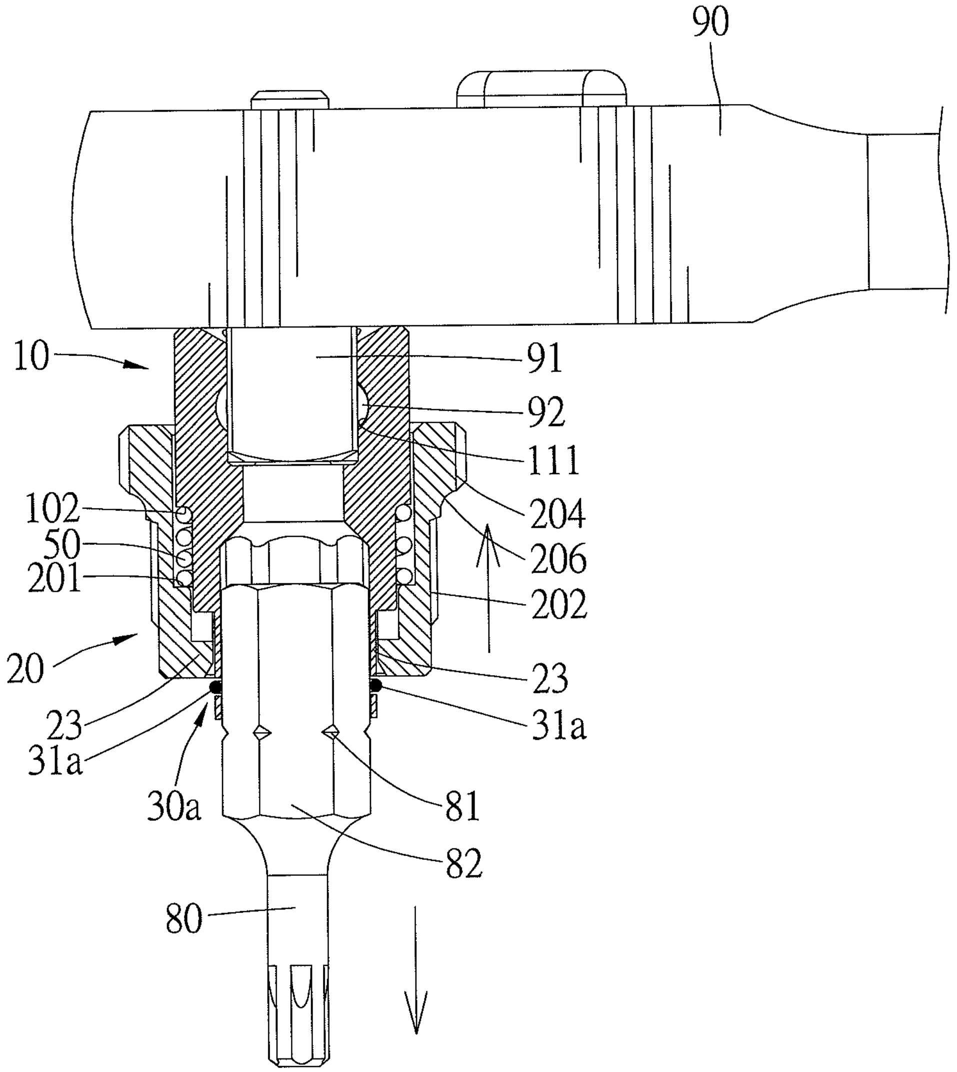
FIG. 7 shows a cross sectional view of the chuck of FIG. 1 with a tool and a bit coupled to the chuck and with a sleeve of the chuck moved to a releasing position allowing removal of the bit.

When it is desired to remove bit 80 from the chuck, the user holds end face 206 of flange 204 of sleeve 20 with the thumb and index finger of one hand and moves sleeve 20 along the longitudinal axis of body 10 toward coupling groove 111 to the releasing position and overcomes spring 50 (FIG. 7). Flat faces 29 slide on chamfered faces 128 along the longitudinal axis when sleeve 20 is moved from the coupling position to the releasing position. Note that the other three fingers of the hand moving sleeve 20 can still hold tool 90 while moving sleeve 20 from the coupling position to the releasing position. Note that bit 80 is still retained in engaging groove 121 by the clamping force of retainer ring 30*a*. Retainer ring 30*a* is no longer covered by sleeve 20 in the releasing position such that outward expansion of retainer ring 30*a* is possible. The user can remove bit 80 from engaging groove 121 with the other hand. Each of first and second rectilinear sections 31*a* of retainer ring 30*a* is moved radially outward from the engaged position to a disengaged position out of groove 81 of bit 80. At the same time, the resilience of retainer ring 30*a* imparts a radially inward force to move first and second rectilinear sections 31*a* radially inward, so that the portion of each of first and second rectilinear sections 31*a* extends into engaging groove 121 of body 10 and in frictional contact with an edge between two sides of shank 82 of bit 80. Thus, when the other hand of the user leaves bit 80 before bit 80 is completely removed out of engaging groove 121, bit 80 will be retained in engaging groove 121 by the friction between first and second rectilinear sections 31*a* of retainer ring 30*a* and bit 80 instead of falling out under the action of gravitational force. However, bit 80 can easily be removed if the user applies a force larger than the frictional force between first and second rectilinear sections 31*a* of retainer ring 30*a* and bit 80. Thus, troublesome removal of the bit 80 encountered in conventional chucks is avoided. Furthermore, the chuck according to the preferred teachings of the present invention can be utilized in places having electronic equipment, as no magnet is used. It can be appreciated that the chuck according to the preferred teachings of the present invention provides synergistic results when utilized with a socket wrench. When coupling of bit 80 into engaging groove 121 is required, the user moves sleeve 20 to the releasing position and inserts shank 82 of bit 80 into engaging groove 121. Sleeve 20, when released by the user, is moved to the coupling position under the action of spring 50, and bit 80 is retained in engaging groove 121 by retainer ring 30*a*.

Figure 8:
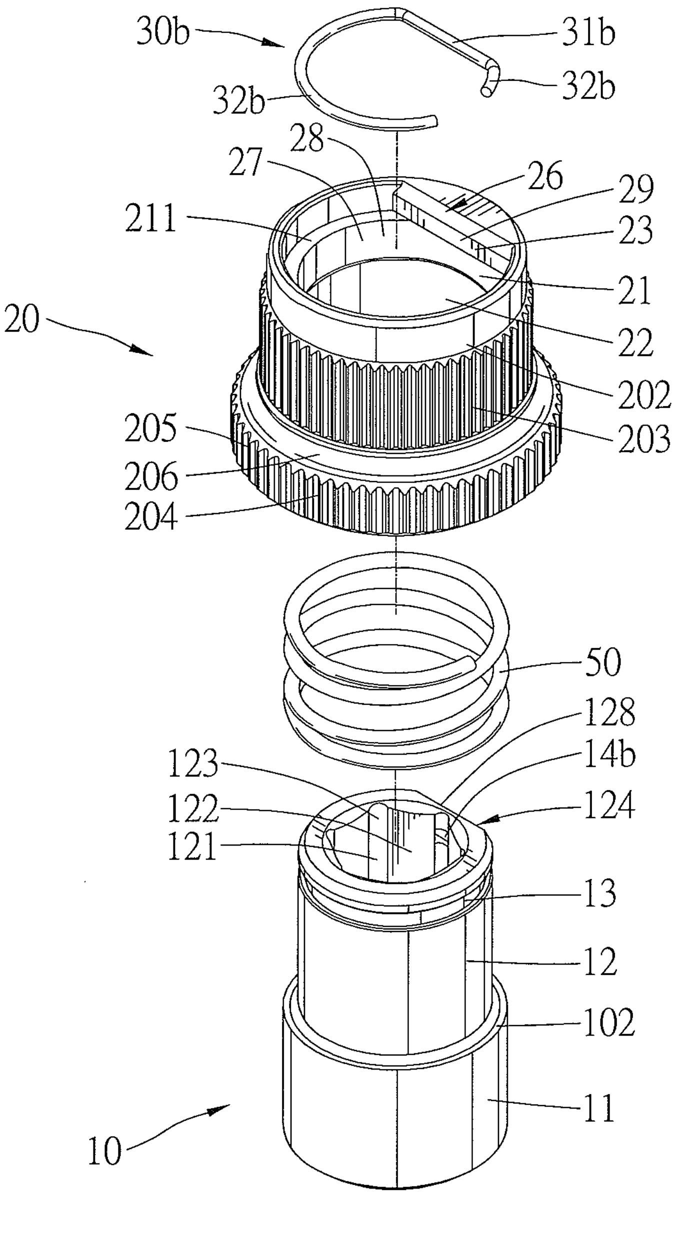
FIG. 8 shows an exploded, perspective view of a chuck of a second embodiment according to the preferred teachings of the present invention.
Figure 9:
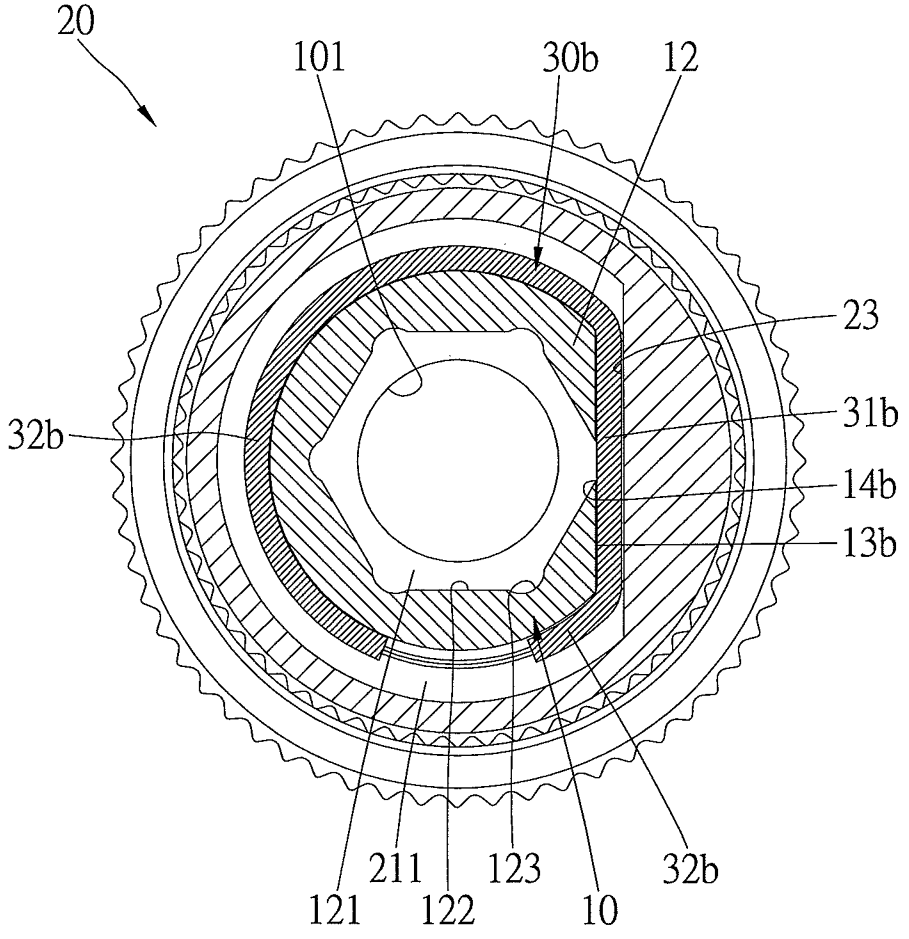
FIG. 9 shows a cross sectional view of the chuck of FIG. 8.

In a modified embodiment of the chuck according to the preferred teachings of the present invention shown in FIGS. 8-9, coupling section 124 includes only one chamfered face 128, and engaging section 26 includes only one extension 23. Furthermore, annular groove 13 includes only one rectilinear positioning portion 13*b* extending across chamfered face 128. An opening 14*b* is defined in a bottom wall of positioning portion 13*b* and extends through one of corners 123 of engaging groove 121. Thus, annular groove 13 is in communication with engaging groove 121 via opening 14*b*. Further, retainer ring (now designated by 30*b*) includes annularly spaced first and second arcuate sections 32*b* each having first and second ends and a rectilinear section 31*b* interconnected between the first ends of first and second arcuate sections 32*b*. The second ends of first and second arcuate sections 32*b* have a gap therebetween. According to the most preferred form shown, first arcuate section 32*b* is longer than second arcuate section 32*b* and extends more than 180 degrees. Retainer ring 30*b* is mounted in annular groove 13 of body 10 with rectilinear section 31*b* received in positioning portion 13*b* of annular groove 13 and with first and second arcuate sections 32*b* partially received in annular groove 13. Specifically, an outer edge of each of first and second arcuate sections 32*b* is outside of annular groove 13 and has a spacing to the outer periphery of sleeve 20 in the radial direction smaller than inner periphery 28 of inner flange 27. Operation of the chuck of FIGS. 8-9 is substantially the same as that of the chuck of FIGS. 1-7.

Figure 10:
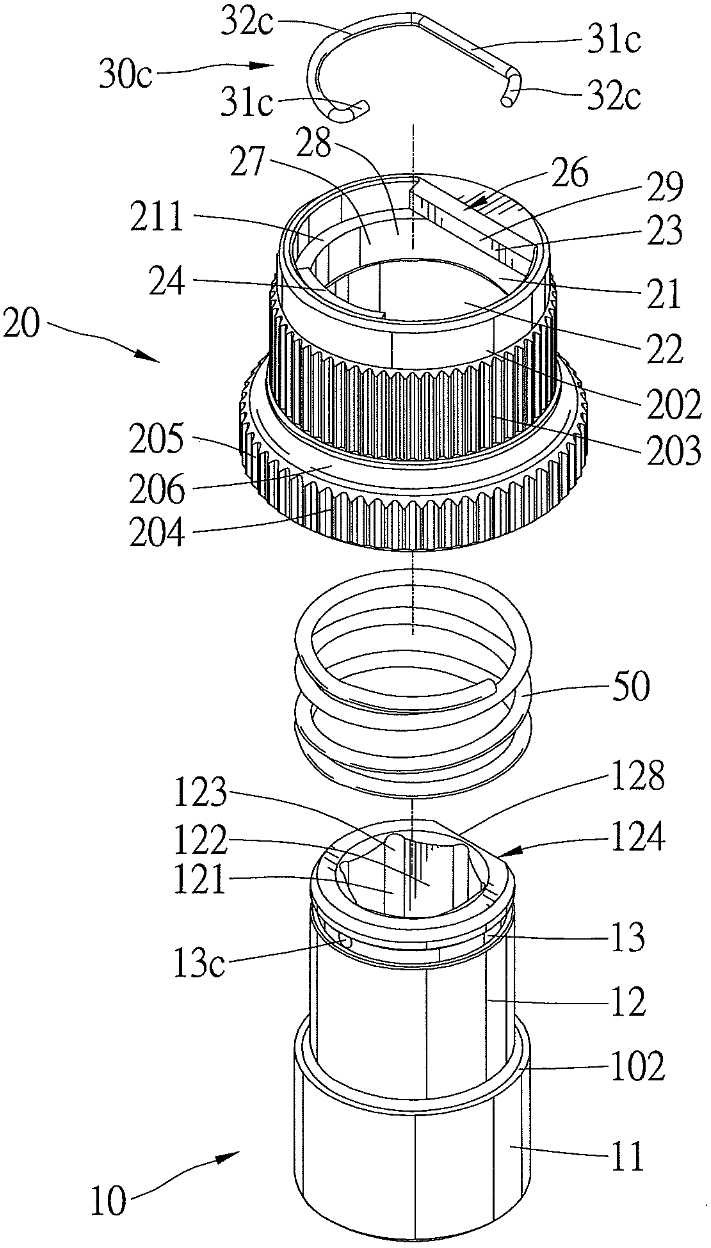
FIG. 10 shows an exploded, perspective view of a chuck of a third embodiment according to the preferred teachings of the present invention.
Figure 11:
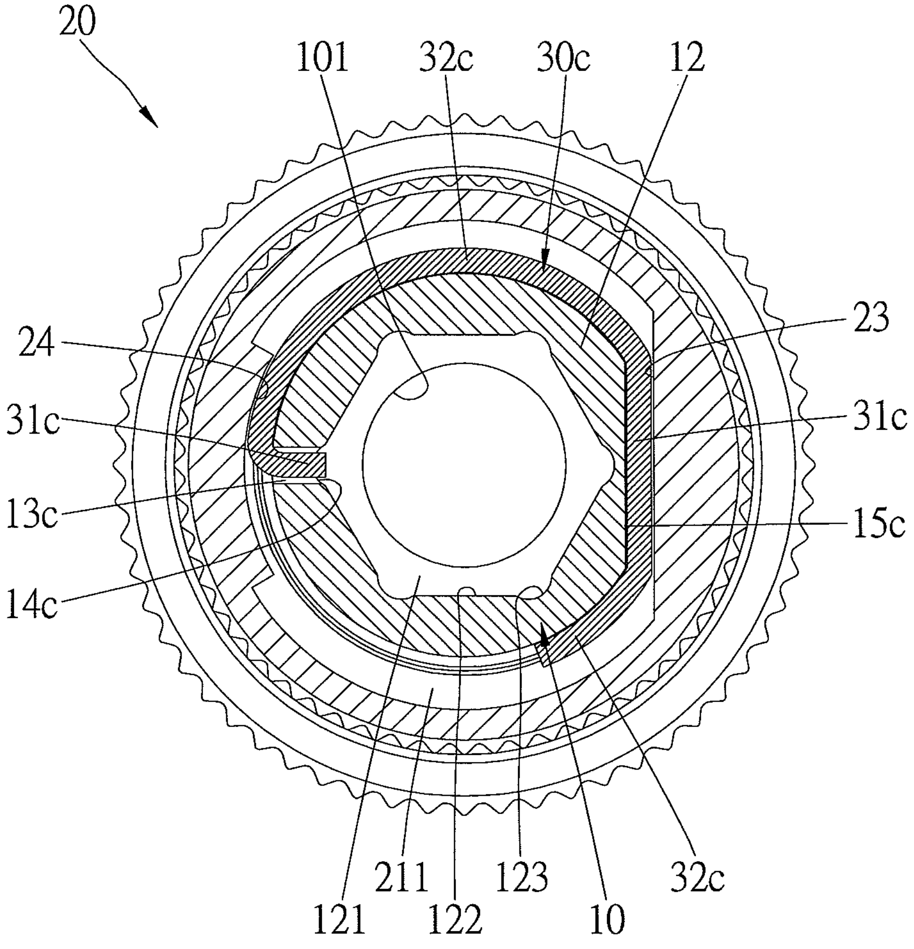
FIG. 11 shows a cross sectional view of the chuck of FIG. 10.
Figure 12:
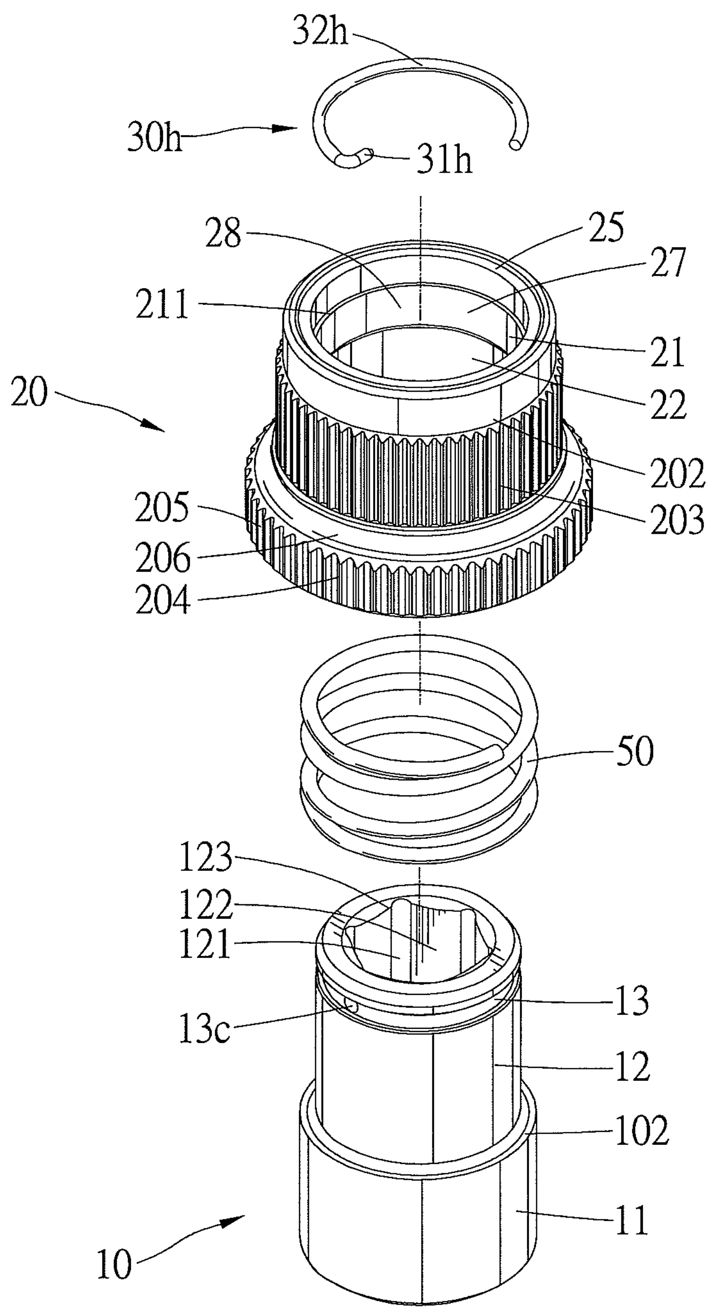
FIG. 12 shows an exploded, perspective view of a chuck of a fourth embodiment according to the preferred teachings of the present invention.

FIGS. 10-12 show another modified embodiment of the chuck according to the preferred teachings of the present invention. According to the preferred form shown, coupling section 124 of body 10 includes only one chamfered face 128.

One of extensions 23 is replaced with an arcuate extension 24 formed on the inner periphery of first compartment 21 and diametrically opposed to extension 23 whose flat face 29 slideably abuts chamfered face 128. Arcuate extension 24 has a spacing to the longitudinal axis in the radial direction larger than inner periphery 28 of inner flange 27. Furthermore, arcuate extension 24 has a spacing to second compartment 22 along the longitudinal axis larger than inner flange 27. Annular groove 13 includes a rectilinear positioning portion 15*c* extending across chamfered face 128. Furthermore, annular groove 13 includes another positioning portion 13*c* in the most preferred form shown as a radial hole diametrically opposed and perpendicular to rectilinear positioning portion 15*c*. An inner end of positioning portion 13*c* forms an opening 14*c* extending through one of corners 123 into engaging groove 121. Thus, annular groove 13 is in communication with engaging groove 121 via opening 14*c*. Furthermore, retainer ring (now designated by 30*c*) includes annularly spaced first and second arcuate sections 32*c* each having first and second ends, a first rectilinear section 31*c* interconnected between first ends of first and second arcuate sections 32*c*, and a second rectilinear section 31*c* extending from the second end of first arcuate section 32*c* toward and spaced from first rectilinear section 31*c* in a direction perpendicular to first rectilinear section 31*c*. The second end of second arcuate section 32*b* and first rectilinear section 31*c* have a gap therebetween. Retainer ring 30*b* is mounted in annular groove 13 of body 10 with first rectilinear section 31*c* received in positioning portion 15*c* of annular groove 13, with second rectilinear section 31*c* received in positioning portion 13*c*, and with first and second arcuate sections 32*c* partially received in annular groove 13. Specifically, an outer edge of each of first and second arcuate sections 32*b* is outside of annular groove 13 and has a spacing to the outer periphery of sleeve 20 in the radial direction smaller than inner periphery 28 of inner flange 27. Note that a distal end of second rectilinear section 31*c* extends through opening 14*c* into engaging groove 121 to retain bit 80 in place.

When sleeve 20 is in the coupling position, extension 23 of sleeve 20 is aligned with positioning portion 15*c* of annular groove 13 and covers first rectilinear section 31*c* of retainer ring 30*c*. Furthermore, arcuate extension 24 of sleeve 20 is aligned with positioning portion 13*c* of annular groove 13. Further, a portion of first arcuate section 32*c* of retainer ring 30*c* is sandwiched between arcuate extension 24 of sleeve 20 and the bottom wall of annular groove 13. Thus, arcuate extension 24 of sleeve 20 prevents outward movement of first rectilinear section 31*c* in the radial direction. As a result, the distal end of second rectilinear section 31*c* is always extended into engaging groove 121 of body 10 via opening 14*c* and reliably retained in an engaged position engaged with groove 81 of bit 80 when sleeve 20 is in the coupling position. Accordingly, bit 80 is securely retained in engaging groove 121. Furthermore, since the outer edge of each of first and second arcuate sections 32*c* is outside of annular groove 13 and has a spacing to the outer periphery of sleeve 20 in the radial direction smaller than inner periphery 28 of inner flange 27, disengagement of sleeve 20 from body 10 by moving sleeve 20 away from first end 11 of body 10 is avoided, since first end face 211 of inner flange 27 will be stopped by the outer edges of first and second arcuate sections 32*c* of retainer ring 30*c*. Thus, retainer ring 30*c* reliably retains and clamps bit 80 in place and reliably retains sleeve 20 on body 10. Other operation of the chuck of FIGS. 10-11 is substantially the same as that of the chuck of FIGS. 1-7.

Figure 13:
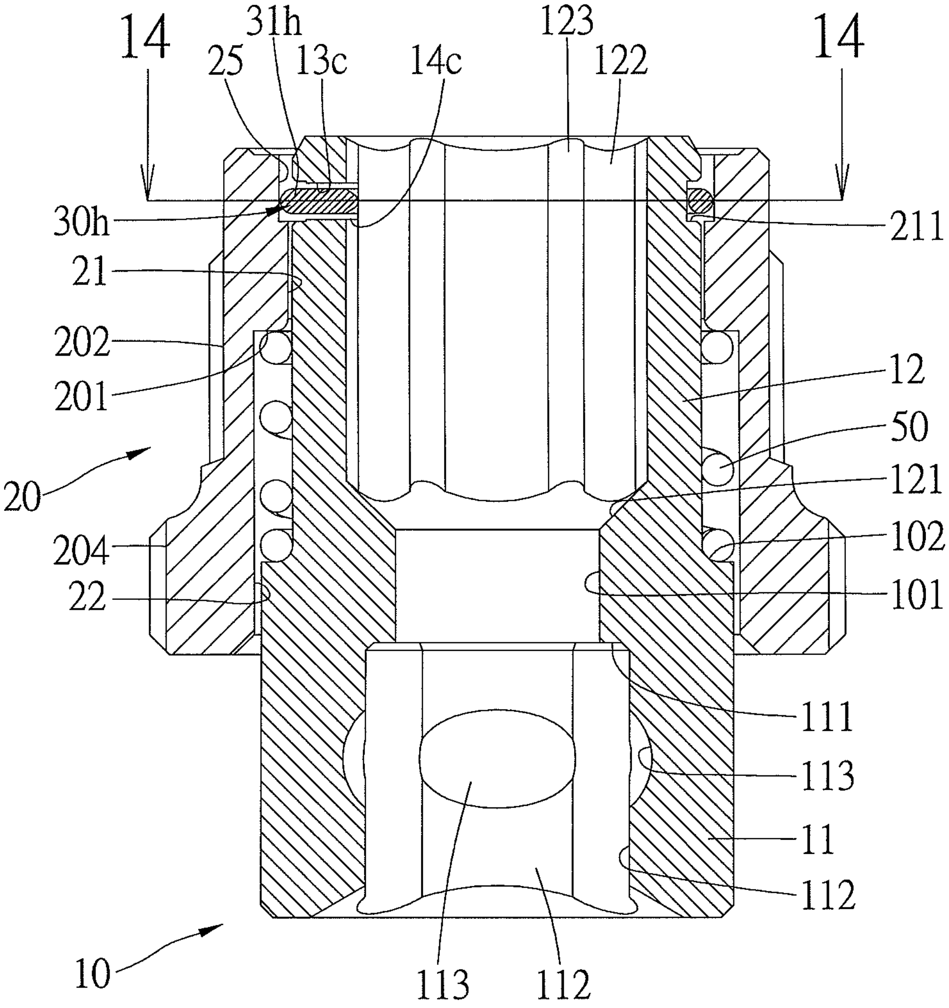
FIG. 13 shows a cross sectional view of the chuck of FIG. 12.
Figure 14:
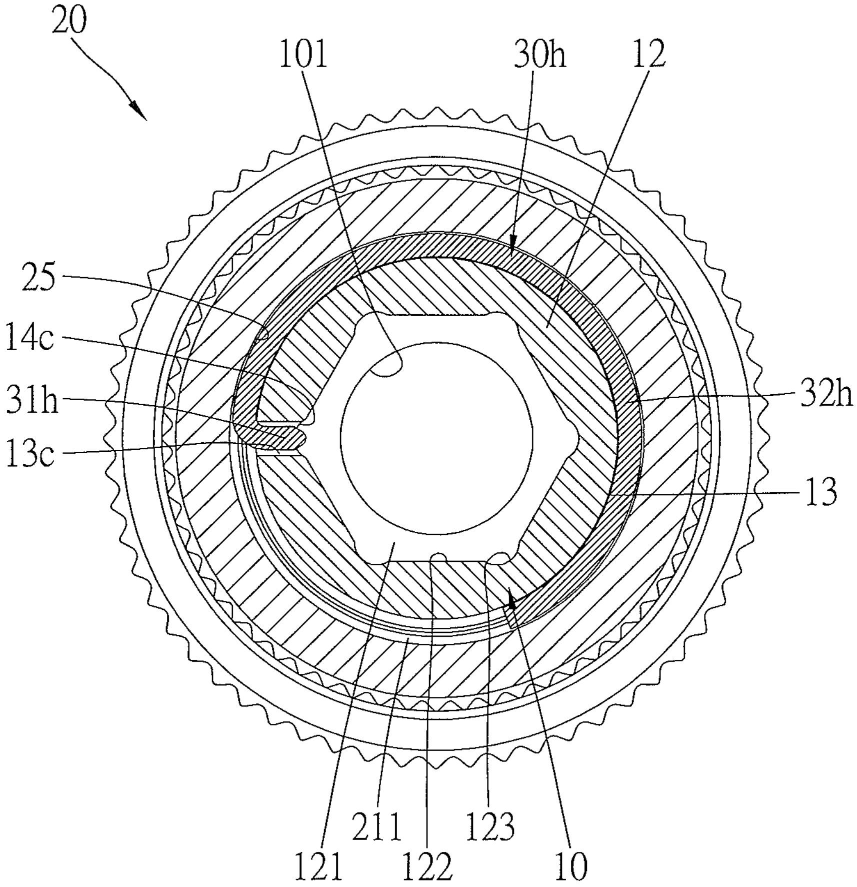
FIG. 14 shows a cross sectional view of the chuck of FIG. 12 according to section line 14-14 of FIG. 13.

FIGS. 12-14 show a further modified embodiment of the chuck according to the preferred teachings of the present invention modified from the embodiment shown in FIGS. 10-11. According to the preferred form shown, coupling section 124 of body 10 and engaging section 26 of sleeve 20 as well as arcuate extension 24 are omitted. Furthermore, retainer ring (now designed by 30*h*) is substantially C-shaped and has a arcuate section 32*h* and a rectilinear section 31*h* extending from an end of arcuate section 32*h* in a direction perpendicular to arcuate section 32*h*. Further, annular groove 13 has no rectilinear positioning portion 15*c*. Retainer ring 30*h* is mounted in annular groove 13 of body 10 with rectilinear section 31*h* received in positioning portion 13*c* and with arcuate section 32*h* partially received in annular groove 13. Specifically, an outer edge of arcuate section 32*h* is outside of annular groove 13 and has a spacing to the outer periphery of sleeve 20 in the radial direction smaller than inner periphery 28 of inner flange 27. Note that a distal end of rectilinear section 31*h* extends through opening 14*c* into engaging groove 12 to retain bit 80 in place. Further, first compartment 21 of sleeve 20 includes an annular flange 25 to compensate the distance between retainer ring 30*h* and the inner periphery of first compartment 21 after omission of extension 23 and arcuate extension 24. Specifically, annular flange 25 has a spacing to second compartment 22 along the longitudinal axis larger than inner flange 27. Furthermore, an inner periphery of annular flange 25 has a spacing to the longitudinal axis in the radial direction larger than inner periphery 28 of inner flange 27. Thus, arcuate section 32*h* of retainer ring 30*h* is sandwiched and retained between the inner periphery of annular flange 25 and the bottom wall of annular groove 13 when sleeve 20 is in the coupling position, preventing movement of rectilinear section 31*h* away from the engaged position. Furthermore, retainer ring 30*h* imparts a clamping force to retain bit 80 in engaging groove 121. Further, the outer edge outside of arcuate section 32*h* outside of annular groove 13 prevents disengagement of sleeve 20 from body 10 by stopping end face 211. Operation of the chuck of FIGS. 12-14 is substantially the same as that of the chuck of FIGS. 10-11 except that sleeve 20 can rotate relative to body 10.

Conclusively, outward expansion of retainer ring 30*a*, 30*b*, 30*c*, 30*h* according to the teachings of the present invention is avoided when sleeve 20 is in the coupling position, such that a portion of retainer ring 30*a*, 30*b*, 30*c*, 30*h* is always extended into engaging groove 121 to retain bit 80 in place. Furthermore, the resilience of retainer ring 30*a*, 30*b*, 30*c*, 30*h* imparts a clamping force to retain bit 80 in engaging groove 121 when sleeve 20 is in the releasing position. Further, retainer ring 30*a*, 30*b*, 30*c*, 30*h* includes arcuate section(s) 32*a*, 32*b*, 32*c*, 32*h* having an outer edge outside of annular groove 13 to prevent disengagement of sleeve 20 from body 10.

Now that the basic teachings of the present invention have been explained, many extensions and variations will be obvious to one having ordinary skill in the art. For example, tool 90 can be in the form of a simple screwdriver handle having a drive column or shank for releasably coupling with coupling groove 111 of body 10 of the chuck according to the preferred teachings of the present invention. Positioning portion 13*a*, 13*b*, 13*c*, 15*c* of annular groove 13 of the chuck according to the preferred teachings of the present invention can have other forms and shapes while providing the same positioning effects. Frictional outer peripheries 203 and 205 of sleeve 20 of the chuck according to the preferred teachings of the present invention can be in other forms such as a knurled structure or such as having regular or irregular embossed patterns. Coupling groove 111 and engaging groove 121 of body 10 of the chuck according to the preferred teachings of the present invention can be spaced from each other by a solid wall. The shape and size of engaging groove 121 can be varied according to those of bit 80 to be coupled with the chuck according to the preferred teachings of the present invention. Inner flange 27 can be continuous or discontinuous along the longitudinal axis. Likewise, inner flange 27 can be continuous or discontinuous in the radial direction. First and second end faces 211 and 201 of inner flange 27 can be at an acute or obtuse angle with inner periphery 28.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A chuck for a bit comprising:

a body including a first end and a second end spaced from the first end along a longitudinal axis of the body, with the second end of the body including an engaging groove adapted for releasably receiving the bit, with the second end of the body further including an annular groove in an outer periphery thereof, with the annular groove including a first positioning portion having an opening extending into the engaging groove, with the first end of the body adapted for releasably coupling with a tool, wherein rotational movement of the tool causes rotational movement of the bit;

a sleeve mounted around the body and movable relative to the body along the longitudinal axis between a coupling position and a releasing position, with the sleeve including a first compartment slideably receiving the second end of the body and a second compartment spaced from the first compartment along the longitudinal axis and slideably receiving the first end of the body;

a retainer ring mounted in the annular groove, with the retainer ring including a first section extending into the engaging groove of the body via the opening to engage with and retain the bit in the engaging groove; and a spring mounted between the body and the sleeve, with the spring biasing the sleeve to the coupling position, with the retainer ring sandwiched and retained between an inner periphery of the first compartment and the bottom wall of the annular groove when the sleeve is in the coupling position, preventing movement of the first section of the retainer ring out of the engaging groove, with the retainer ring imparting a clamping force to retain the bit in the engaging groove, and with the bit removable from the engaging groove of the body when the sleeve is in the releasing position, with the first section of the retainer ring movable away from the engaging groove when applying a removing force to remove the bit from the engaging groove, with the bit retained in the engaging groove by the clamping force of the retainer ring when the sleeve is in the releasing position and when no force is applied to the bit, with the retainer ring having resilience capable of returning the first section of the retainer ring to engage with the bit during application of the removing force when the sleeve is in the releasing position, wherein the bit is retained in place by the first section of the retainer ring when the removing force is released before the bit is removed out of the engaging groove, with the first compartment including an inner flange formed on an inner periphery thereof, with the inner flange including an end face facing away from the second compartment and extending transversely to the longitudinal axis, with the first positioning portion of the annular groove being rectilinear, with the annular groove further including a second rectilinear positioning portion parallel to and spaced from the first positioning portion and having a second opening extending into the engaging groove, with the retainer ring including annularly spaced first, second, and third arcuate sections, with the first section of the retainer ring being rectilinear and interconnected between the first and second arcuate sections, with the first section of the retainer ring received in the positioning portion of the annular groove, with a portion of the first section of the retainer ring extending into the engaging groove via the opening, with the retainer ring further including a second rectilinear section interconnected between the second and third arcuate sections, with the second rectilinear section of the retainer ring received in the second rectilinear positioning portion of the annular groove, with a portion of the second rectilinear section of the retainer ring extending into the engaging groove via the second opening, with each of the first, second, and third arcuate sections partially received in the annular groove and including an outer edge outside of the annular groove, with the outer edge of each of the first, second, and third arcuate sections having a spacing to an outer periphery of the sleeve in the radial direction smaller than an inner periphery of the inner flange, with the first end face of the inner flange stopped by the outer edges of the first, second, and third arcuate sections of the retainer ring when the sleeve is moved in a direction away from the first end of the body, preventing the sleeve from disengaging from the body, with the second end of the body including diametrically opposed first and second chamfered faces on an outer periphery thereof, with the first positioning portion of the annular groove extending across the first chamfered face, with the second rectilinear positioning portion of the annular groove extending across the second chamfered face, with the first compartment of the sleeve further including first and second extensions extending inward from the inner periphery thereof in the radial direction, with each of the first and second extensions having a spacing to the second compartment along the longitudinal axis larger than the inner flange, with the first extension including a first flat face having a spacing to the longitudinal axis in the radial direction smaller than an inner periphery of the inner flange, with the first section of the retainer ring sandwiched and retained between the first flat face of the first extension and the bottom wall of the annular groove when the sleeve is in the coupling position, with the second extension including a second flat face parallel to and spaced from the first flat face, with the second flat face having a spacing to the longitudinal axis in the radial direction smaller than the inner periphery of the inner flange, and with the second rectilinear section of the retainer ring sandwiched and retained between the second flat face of the second extension and the bottom wall of the annular groove when the sleeve is in the coupling position.

2. The chuck for the bit as claimed in claim 1, with the retainer ring mounted in the annular groove and extending over 180° around the longitudinal axis.

3. The chuck for the bit as claimed in claim 1, with the inner flange further including a second end face facing the second compartment, with the body further including a shoulder on an outer periphery thereof, and with the spring mounted around the body between the shoulder and the second end face.

4. The chuck for the bit as claimed in claim 1, with the positioning portion of the annular groove including a radial hole extending in a radial direction perpendicular to the longitudinal axis, with the radial hole having an inner end forming the opening, and with the first section of the retainer ring extending through the radial hole into the engaging groove.

5. The chuck for the bit as claimed in claim 1, with the sleeve further including a flange on an outer periphery thereof, with the flange of the sleeve adapted to be gripped by a user for moving the sleeve from the coupling position to the releasing position, and with the flange of the sleeve including a first frictional outer periphery for providing friction when the sleeve is manually rotated about the longitudinal axis by rotating the first frictional outer periphery.

6. The chuck for the bit as claimed in claim 5, with the flange formed on an end of the outer periphery of the sleeve and around the second compartment, with the sleeve further including an annular protrusion formed on another end of the outer periphery thereof and around the first compartment, with the flange of the sleeve including an end face facing the annular protrusion, with the end face adapted to be gripped by the user for moving the sleeve from the coupling position to the releasing position, and with the annular protrusion including a second frictional outer periphery for providing friction when the sleeve is manually rotated about the longitudinal axis by manually rotating the second frictional outer periphery.

7. The chuck for the bit as claimed in claim 1, with the first compartment of the sleeve including an arcuate extension formed on the inner periphery thereof, with the arcuate extension having a spacing to the longitudinal axis in the radial direction smaller than the inner periphery of the inner flange, with the arcuate extension having a spacing to the second compartment along the longitudinal axis larger than the inner flange, and with a portion of the first arcuate section of the retainer ring sandwiched and retained between the arcuate extension and the bottom wall of the annular groove when the sleeve is in the coupling position, preventing movement of the first section of the retainer ring away from the engaging groove.

8. The chuck for the bit as claimed in claim 7, with the second end of the body including a chamfered face on an outer periphery thereof, with the rectilinear positioning portion of the annular groove extending across the chamfered face, with the first compartment of the sleeve further including an extension extending inward from the inner periphery of the first compartment in the radial direction, with the extension having a flat face having a spacing to the longitudinal axis in the radial direction smaller than the inner periphery of the inner flange, with the extension including a spacing to the second compartment along the longitudinal axis larger than the inner flange, with the second rectilinear section of the retainer ring sandwiched and retained between the flat face of the extension and the bottom wall of the annular groove when the sleeve is in the coupling position, with the flat face slideably abutting the chamfered face along the longitudinal axis allowing sliding movement of the sleeve relative to the body between the coupling position and the releasing position, and with the flat face engaging with the chamfered face to allow joint rotation of the sleeve and the body when the sleeve is manually rotated.

9. The chuck for the bit as claimed in claim 8, with the sleeve further including a flange on an outer periphery thereof, with the flange of the sleeve adapted to be gripped by a user for moving the sleeve from the coupling position to the releasing position, and with the flange of the sleeve including a first frictional outer periphery for providing friction when the sleeve is manually rotated about the longitudinal axis by rotating the first frictional outer periphery.

10. The chuck for the bit as claimed in claim 9, with the flange formed on an end of the outer periphery of the sleeve and around the second compartment, with the sleeve further including an annular protrusion formed on another end of the outer periphery thereof and around the first compartment, with the flange of the sleeve including an end face facing the annular protrusion, with the end face adapted to be gripped by the user for moving the sleeve from the coupling position to the releasing position, and with the annular protrusion including a second frictional outer periphery for providing friction when the sleeve is manually rotated about the longitudinal axis by manually rotating the second frictional outer periphery.

11. The chuck for the bit as claimed in claim 1, with the first compartment of the sleeve including an extension extending inward from the inner periphery of the first compartment in the radial direction, with the extension including a flat face having a spacing to the longitudinal axis in the radial direction smaller than the inner periphery of the inner flange, with the extension having a spacing to the second compartment along the longitudinal axis larger than the inner flange, and with the second rectilinear section of the retainer ring sandwiched and retained between the flat face of the extension and the bottom wall of the annular groove when the sleeve is in the coupling position.

12. The chuck for the bit as claimed in claim 11, with the second end of the body including a chamfered face on an outer periphery thereof, with the second rectilinear positioning portion of the annular groove extending across the chamfered face, with the flat face slideably abutting the chamfered face along the longitudinal axis allowing sliding movement of the sleeve relative to the body between the coupling position and the releasing position, and with the flat face engaging with the chamfered face to allow joint rotation of the sleeve and the body when the sleeve is manually rotated.

13. The chuck for the bit as claimed in claim 1, with the first and second flat faces slideably abutting the first and second chamfered faces along the longitudinal axis allowing sliding movement of the sleeve relative to the body between the coupling position and the releasing position, and with the first and second flat faces engaging with the first and second chamfered faces to allow joint rotation of the sleeve and the body when the sleeve is manually rotated.

14. The chuck for the bit as claimed in claim 13, with the sleeve further including a flange on an outer periphery thereof, with the flange adapted to be gripped by a user for moving the sleeve from the coupling position to the releasing position, and with the flange including a first frictional outer periphery for providing friction when the sleeve is manually rotated about the longitudinal axis by rotating the first frictional outer periphery.

* * * * *